E. WICK.
HORSE RAKE.
APPLICATION FILED MAR. 28, 1912.
1,061,649.
Patented May 13, 1913.
2 SHEETS—SHEET 1.
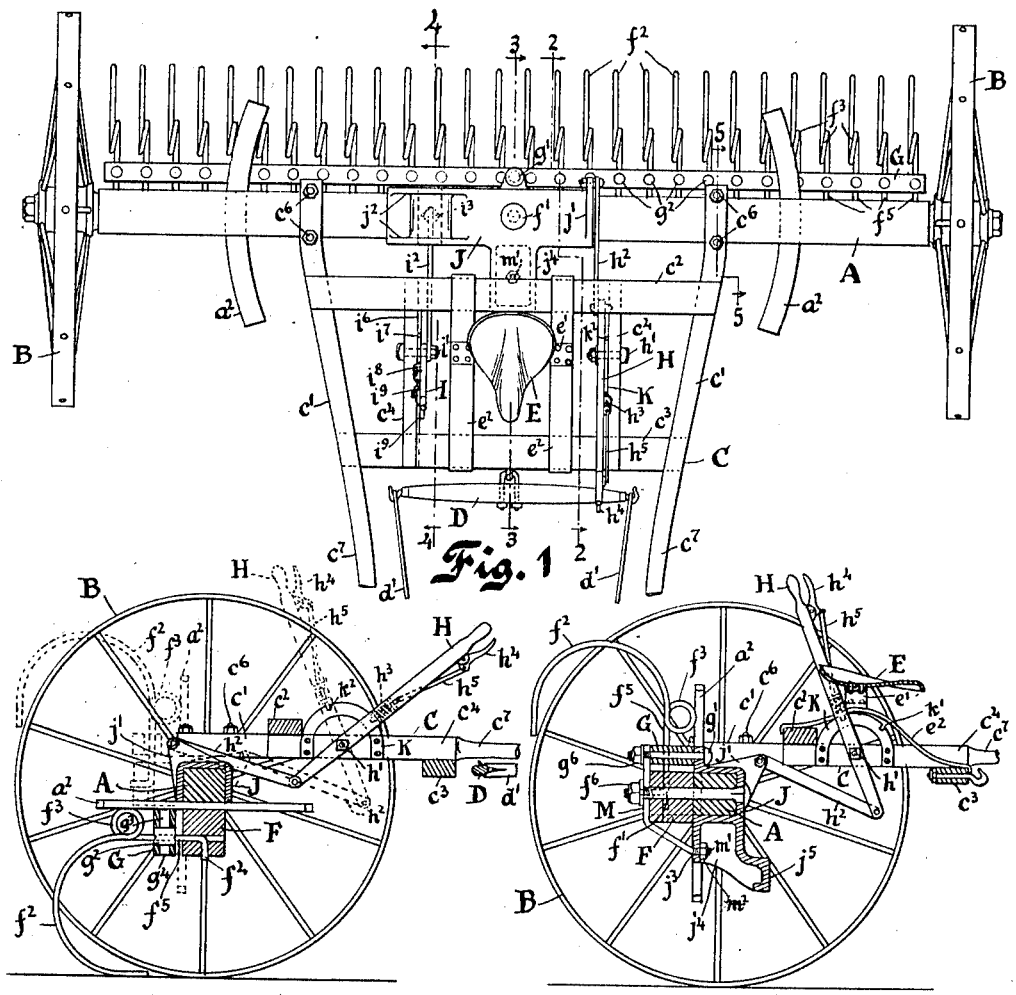
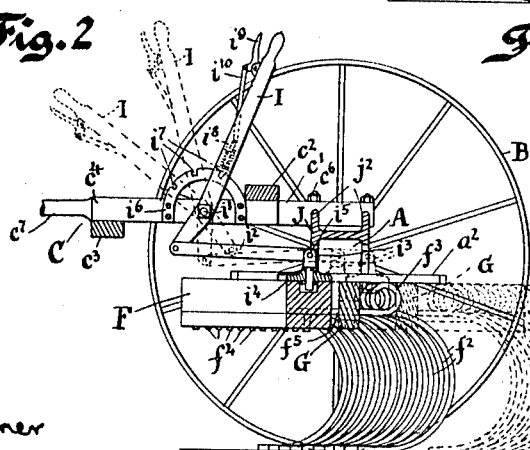
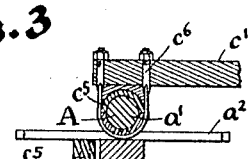
Witnesses
Edward Wick,
Inventor

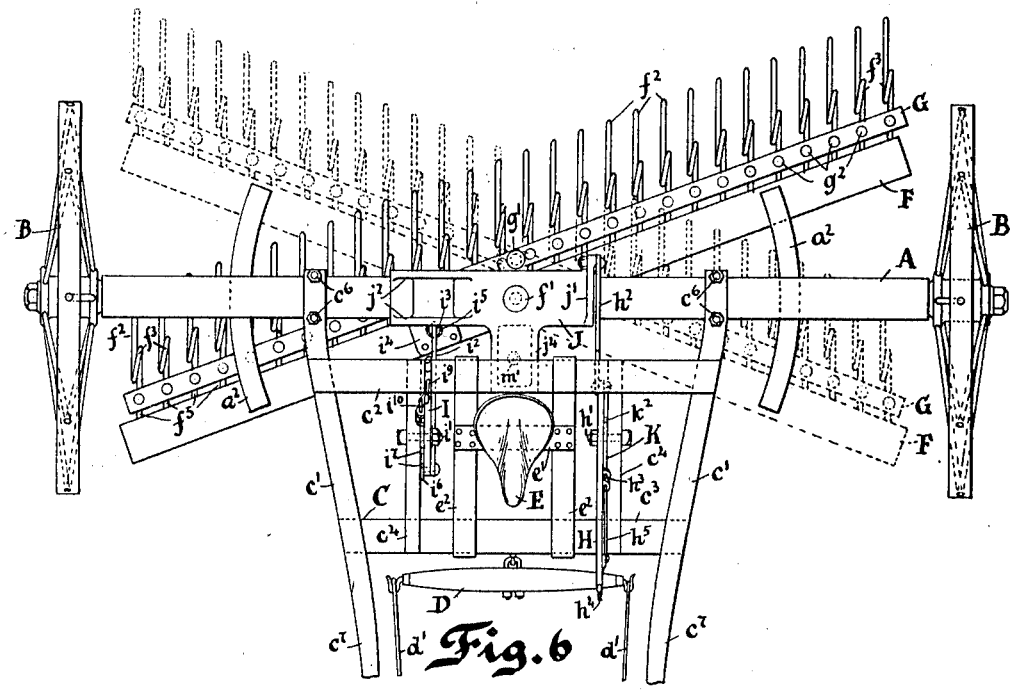
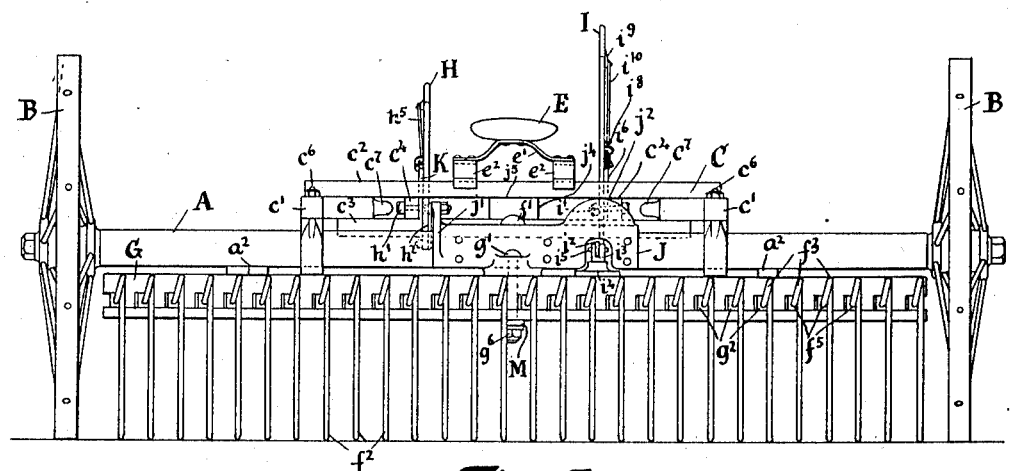
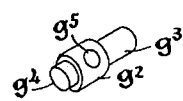

UNITED STATES PATENT OFFICE.

EDWARD WICK, OF KIEL, WISCONSIN.

HORSE-RAKE.

1,061,649.	Specification of Letters Patent.	Patented May 13, 1913.

Application filed March 28, 1912. Serial No. 686,774.

*To all whom it may concern:*

Be it known that I, EDWARD WICK, of Kiel, Wisconsin, have invented a Horse-Rake, of which the following is a specification.

The present invention relates to horse-rakes which are adapted to be drawn by animal or mechanical traction, and the object which I have in view is to provide a rake which can be operated either as a dumping-rake or side-delivery rake as desired by the operator.

My invention comprises in general a wheeled frame having an axle-tree which is adapted to carry the rake-teeth and is provided with means for turning it through a right angle, in order to dump the load; and an auxiliary frame on which the rake-teeth are directly mounted, said auxiliary frame being pivoted to the first-named frame about a vertical axis, and there being provided a hand-lever or other such device for skewing it to one side or the other, whereby the rake-teeth are caused to assume an oblique position with respect to the direction of movement.

The nature of my invention and in what manner it may be performed is more particularly set forth in the following description of a concrete embodiment thereof, which is illustrated in the accompanying drawings, wherein—

Figure 1 is a plan view of a complete rake constructed according to my invention; Fig. 2 is a transverse section of the same taken on the plane 2; Fig. 3 is a transverse central section through the rake on the plane 3, the rake-teeth being shown in the raised or dumping position; Fig. 4 is a transverse section of the rake taken on the plane 4, the rake-teeth being in the side-delivery position; Fig. 5 is a fragmentary transverse section on the plane 5 to illustrate the journal of the main-frame; Fig. 6 is a plan-view of the complete apparatus in one of the two side-delivery positions, the other being shown dotted; Fig. 7 is a rear view of the complete rake; and Fig. 8 is a perspective of one of the pivot-guides for the rake-teeth.

In these drawings, each reference-character refers to the same part wherever it occurs.

In the construction of my apparatus, I provide a main axletree A, which carries upon its end wheels B, upon which the rake rolls and which provide bearings about which the axletree turns, when the rake is dumped. Intermediate between the two wheels are journals $a'$ for the main frame C, said frame comprising longitudinal bars $c'$ united by transverse bars $c^2$ and $c^3$ and longitudinal members $c^4$ on opposite sides of the center. The exact construction and arrangement of the elements of this frame are, however, immaterial to my invention. The rear ends of the longitudinals $c'$ are formed with bearing-boxes $c^5$ which embrace the journals $a'$ and are secured in place by strap-bolts $c^6$, and the free ends of said bars $c'$ may be prolonged as shown to form shafts $c^7$ where a horse or mule is to be used to draw the rake, and in this case also a whiffletree D is connected to the transverse bar $c^3$ for connecting the traces $d'$. Upon this frame C is arranged a seat E for the driver, said seat being suitably supported by a resilient transverse bar $e'$, whose ends are riveted and secured to a pair of longitudinal resilient bars $e^2$, the latter in turn resting upon the members $c^2$ and $c^3$ as shown.

At the center of the axletree A there is a vertical pivot pin $f'$ which depends from the lower side thereof, and on it is pivoted an auxiliary frame F which carries the rake-teeth $f^2$, said rake-teeth being as usual of recurved form and provided with a spring-loop $f^3$ to give the requisite resiliency. Each of these rake-teeth has its upper extremity pivotally mounted at a point on the frame F, as for example by turning down the end of the tooth to form a pivotal portion $f^4$ which turns in a corresponding bore in the frame F. In addition there is a secondary bar G parallel to the frame F, and it is likewise pivoted by a vertical pivot-pin $g'$ to the axletree A. Said bar G carries a plurality of pivoted guide-blocks $g^2$, which have trunnions $g^3$ and $g^4$ turning in bearings in the bar G, and said blocks have also transverse perforations $g^5$, through which the shanks $f^5$ of the rake-teeth $f^2$ pass. The axes of the pivotal ends $f^4$ are all in one vertical transverse plane which includes the axis of the pivot-pin $f'$, and in like manner the axes of the guide-blocks $g^2$ are all in a parallel vertical plane which includes the axis of the pivot-pin $g'$. Now the pivot-blocks $g^2$ are equably spaced in the bar G and opposite the respective pivot-ends $f^4$ of the rake-teeth, in such manner that as the frame F is turned about its pivot-pin $f'$, the bar G is likewise turned about its pivot-pin $g'$ and serves as a guide to keep the rake-teeth in parallel position to each other and to the direction of movement of the rake. A pair of arc-shaped bars $a^2$ are fastened to the underside of the axle-tree A to form abutments against which the frame F and bar G rest in all positions.

In order to effect the two movements of the rake, namely the dumping movement and the skewing movement, which have to be independent of each other, I provide two hand-levers, H and I, pivoted at $h'$ and $i'$ upon the respective bars $c^4$. The axletree A is strengthened and supported by a channeled casting or other metal piece J which embraces the top and sides of the axletree A for some distance each side of the center as shown, and through which the pivot-pins $f'$ and $g'$ pass. The member J has on its left-hand end a rock-arm $j'$, which is connected by a link $h^2$ to the lower end of the lever H, and it will be seen that by swinging the lever H upon its pivot $h'$ the rock-arm $j'$ and with it the entire axletree, frame F and rake-teeth $f^2$ will be swung backwardly and upwardly into the dumping position shown in Fig. 3. An arcuate plate K is secured to the bar $c^4$ concentric with the pivot $h'$ of the lever H and provided with two notches $k'$ and $k^2$, in which a spring-pressed sliding bolt $h^3$ mounted on the lever H is adapted to releasably engage, and said sliding-bolt may be conveniently operated by a finger-lever $h^4$, connected thereto by a link $h^5$. When in the lower position, the bolt $h^3$ is caused to engage the notch $k'$ and in this position the rake-teeth are held down to their work, but when it is desired to dump the rake, the finger-lever $h^4$ being pressed to release the bolt $h^3$, the lever H is swung backward; and if it is desired to hold the rake lifter, as in driving to and from work, the bolt $h^3$ is caused to engage with the notch $k^2$. On the other side of the seat E is mounted the lever I as aforesaid and its lower end is connected by a link $i^2$ with an upright swivel-post $i^3$ carried by a standard $i^4$ upon the frame F at one side of the pivot-pin $f'$. The middle position of the pivot-pin $i^5$ which unites the link $i^2$ with the swivel-post is exactly in the axis of rotation of the axletree A, whereby when it is in the center, the relative position of the rake and of the lever I will not be affected by the dumping-movement hereinbefore described. To this end, the axletree A is cut away on its lower side as shown and the metal part J is provided with reinforcing flanges or ribs $j^2$. Concentric with the lever I is an arcuate plate $i^6$ having three notches $i^7$ (more may be provided if desired) corresponding respectively to the middle and two extreme positions of said lever, one of which extreme positions with the corresponding one of the rake-teeth and associated elements, is shown in Figs. 4 and 6 in full lines and the other in dotted lines. In the former position the delivery of the rake is on the left-hand side and in the latter position on the right-hand side. To hold the rake in these three positions, a spring-pressed sliding bolt $i^8$ is mounted on the lever I and may be operated by a finger-lever $i^9$ connected thereto by a link $i^{10}$, said bolt engaging in the notches $i^7$.

It will be readily seen from the drawing that when the rake is in the raised position of Fig. 3, the side-delivery lever I cannot be operated and must remain in its central position; and conversely when the rake is in either of its extreme side-delivery positions of Figs. 4 and 6, the lever cannot be operated.

For the purpose of reinforcing and bracing the construction, a metal strap M is provided which is perforated to pass over the lower ends of the pivot-pins $f'$ and $g'$, these latter having nuts $f^6$ and $g^6$ on their lower threaded ends below said strap. Said strap M is turned up obliquely at the front and provided with a threaded stud $m'$ which passes through an aperture $j^3$ in an extension $j^4$ of the member J, and said stud is drawn up by means of a nut $m^2$. The extension $j^4$ is further extended to form a rest or abutment-surface $j^5$, which is adapted in the lowered position of the rake to constitute a rest against the lower side of the cross-bar $c^2$. This, however, is not essential to my invention.

I wish it understood that my invention is not limited to the use of all the above described features and constructions, for some may be omitted and others may be varied or modified in various ways, as will readily occur to those skilled in the art.

Having thus described my invention, what I claim as new and desire to secure by Letters Patent, is:

1. In a rake, the combination of an axletree transverse to the direction of movement, a pair of wheels rotatably mounted on the ends of said axletree, a frame journaled on said axletree, means on said frame for turning said axletree about its own axis, an auxiliary frame pivoted to said axletree to turn about a normally vertical central axis, a set of rake-teeth carried by said auxiliary frame, means carried by said first-named frame for laterally shifting the auxiliary frame to a position oblique to the direction of movement, said rake-teeth being pivoted on said auxiliary frame and being maintained constantly parallel to the direction of movement in every position of said auxiliary frame.

2. In a rake, the combination of a horizontal transverse axletree, a main frame journaled thereon, a pair of wheels mounted on the ends of said axletree on which it is adapted to run and which form bearings on which it is adapted to turn, a hand-lever mounted on said frame and connected with said axletree to turn the latter about its axis, an auxiliary frame pivoted at the center of said axletree and under the latter to turn about a normally vertical pivot in either direction, a plurality of rake-teeth carried by said auxiliary frame, means for turning said auxiliary frame about its pivot to a position oblique to the direction of propulsion of the rake, means for keeping said rake-teeth parallel to the direction of propulsion of the rake in all positions of said auxiliary frame, and means mounted on said main frame for skewing said auxiliary frame in either direction.

3. In a rake, the combination of a horizontal transverse axletree, a main frame journaled thereon, a pair of wheels mounted on the ends of said axletree on which it is adapted to run and which form bearings on which it is adapted to turn, a hand-lever mounted on said frame and connected with said axletree to turn the latter about its axis, an auxiliary frame pivoted at the center of said axletree to turn about a normally vertical pivot, a plurality of rake-teeth carried by said auxiliary frame, means for turning said auxiliary frame about its pivot to a position oblique to the direction of propulsion of the rake, means for keeping said rake-teeth parallel to the direction of propulsion of the rake in all positions of said auxiliary frame, a lever mounted on said main frame, and a link connecting said lever with a point of said auxiliary frame at one side of the pivot thereof, said point lying in the axis of rotation of said axletree in one position of said auxiliary frame, whereby in said position only the axletree can be rotated.

4. In a rake, the combination of a horizontal transverse axletree, a main frame journaled thereon, a pair of wheels mounted on the ends of said axletree on which it is adapted to run and which form bearings on which it is adapted to turn, a hand-lever mounted on said frame and connected with said axletree to turn the latter about its axis, an auxiliary frame pivoted at the center of said axletree to turn about a normally vertical pivot, a plurality of rake-teeth carried by said auxiliary frame, means for turning said auxiliary frame about its pivot to a position oblique to the direction of propulsion of the rake, means for keeping said rake-teeth parallel to the direction of propulsion of the rake in all positions of said auxiliary frame, a lever mounted on said main frame, a link connecting said lever with a point of said auxiliary frame at one side of the pivot thereof, said point lying in the axis of rotation of said axletree in one position of said auxiliary frame, whereby in said position only the axletree can be rotated, and means for locking said auxiliary-frame shifting-lever in the position corresponding to said position of the auxiliary frame.

5. In a rake, the combination of a main frame, an axle or shaft transverse to said frame and rotatable about an axis parallel to itself, a lever mounted on said main frame and adapted to rotate said axle or shaft, an auxiliary member pivoted to said axle or shaft upon a substantially vertical axis, midway of its length, a second lever mounted on said main frame and adapted to shift said member about its axis, and a set of rake-teeth carried by said member.

6. In a rake, the combination of a main frame, an axle transverse to said frame and rotatable about an axis parallel to itself, a lever mounted on said main frame and adapted to rotate said axle, an auxiliary member pivoted to said axle upon a substantially vertical axis midway of its length, a second lever mounted on said main frame and connected with said member adapted to shift it about its axis, and a set of rake-teeth carried by said member, each of said levers being operable independently of the other lever.

7. In a rake, the combination of an axletree transverse to the direction of movement, a pair of wheels rotatably mounted on the ends of said axletree, a frame journaled on said axletree, means on said frame for turning said axletree about its own axis, an auxiliary frame pivoted with respect to said axletree about a normally vertical axis centrally of its length whereby it is adapted to swing to an oblique position in either direction with respect to said axletree, a set of rake-teeth carried by said auxiliary frame and means carried by said first-named frame for laterally shifting the auxiliary frame to a position oblique to the direction of movement.

In witness whereof I have hereunto set my hand this 25 day of March, 1912.

EDWARD WICK.

In presence of—
 RICHARD KIEL,
 D. F. NAUTT.

Copies of this patent may be obtained for five cents each, by addressing the "Commissioner of Patents, Washington, D. C."